(12) United States Patent
Renschler et al.

(10) Patent No.: US 12,717,290 B2
(45) Date of Patent: Aug. 25, 2026

(54) METHOD AND SYSTEM FOR OPEN-LOOP OR CLOSED-LOOP CONTROL OF A TECHNICAL DEVICE

(71) Applicant: Siemens Aktiengesellschaft, Munich (DE)

(72) Inventors: Albert Renschler, Ettlingen (DE); Thomas Grosch, Roßtal (DE); Jürgen Laforsch, Bühl (DE)

(73) Assignee: Siemens Aktiengesellschaft, Munich (DE)

( * ) Notice: Subject to any disclaimer, the term of this patent is extended or adjusted under 35 U.S.C. 154(b) by 641 days.

(21) Appl. No.: 18/028,837

(22) PCT Filed: Sep. 6, 2021

(86) PCT No.: PCT/EP2021/074481
§ 371 (c)(1),
(2) Date: Mar. 28, 2023

(87) PCT Pub. No.: WO2022/069157
PCT Pub. Date: Apr. 7, 2022

(65) Prior Publication Data

US 2024/0027979 A1 Jan. 25, 2024

(30) Foreign Application Priority Data

Sep. 29, 2020 (EP) .................................... 20199015

(51) Int. Cl.
*G05B 13/02* (2006.01)
*G05B 15/02* (2006.01)
(Continued)

(52) U.S. Cl.
CPC ........... *G05B 15/02* (2013.01); *G05B 13/026* (2013.01); *G05B 19/0423* (2013.01); *G05B 19/4185* (2013.01); *Y02P 90/02* (2015.11)

(58) Field of Classification Search
USPC .......................................................... 700/28
See application file for complete search history.

(56) References Cited

U.S. PATENT DOCUMENTS 5,832,468 A * 11/1998 Miller .................. G05B 13/027 706/23
2004/0236492 A1 11/2004 Yasui et al.
(Continued)

FOREIGN PATENT DOCUMENTS

CN 105527841 4/2016
CN 109716361 5/2019
(Continued)

OTHER PUBLICATIONS

PCT International Search Report dated Dec. 14, 2021 based on PCT/EP2021/074481 filed Sep. 6, 2021.

*Primary Examiner* — Emilio J Saavedra
(74) *Attorney, Agent, or Firm* — Cozen O'Connor

(57) ABSTRACT

System and method for influencing an open-loop or closed-loop control parameter of a technical device by at least one initial parameter that is generated in accordance with at least one input parameter, wherein a predicted future value of a parameter detected in the technical device is used as an input parameter to compensate at least in part for temporal delays between the detection of the parameter and the generation of the initial parameter from the input parameter, where delays in the transmission and processing of values of input parameters can thus be compensated for and dead times in the open-loop or closed-loop control of the technical device that are caused thereby can be prevented.

8 Claims, 4 Drawing Sheets

(51) Int. Cl.
*G05B 19/042* (2006.01)
*G05B 19/418* (2006.01)

(56) References Cited

U.S. PATENT DOCUMENTS

| | | | | |
|---|---|---|---|---|
| 2008/0249641 | A1* | 10/2008 | Enver | G05B 19/042 700/9 |
| 2014/0249653 | A1 | 9/2014 | Blevins et al. | |
| 2015/0094988 | A1* | 4/2015 | Schumacher | G01M 99/00 702/188 |
| 2016/0141918 | A1* | 5/2016 | Rohrauer | H02J 3/38 700/297 |
| 2017/0031856 | A1 | 2/2017 | Langolf et al. | |
| 2017/0082480 | A1* | 3/2017 | Sai | G01F 25/10 |
| 2020/0050321 | A1 | 2/2020 | Dyvik et al. | |
| 2020/0089366 | A1 | 3/2020 | Lin et al. | |

FOREIGN PATENT DOCUMENTS

| | | | | |
|---|---|---|---|---|
| CN | 109891491 | | 6/2019 | |
| CN | 111025913 | | 4/2020 | |
| CN | 111025913 | A * | 4/2020 | G05B 13/048 |
| DE | 102004012054 | | 9/2004 | |
| EP | 1201319 | | 5/2002 | |
| EP | 3125053 | | 7/2017 | |
| WO | 9731749 | | 9/1997 | |

* cited by examiner 20
1
2
7
3
4
8
E
A
23
24
9
11
12
13
14
17
10
22
12
5
5
5
6
21
21
21
30

P
M
Me
P1
M1
P2
P3
D
t1
8
12
T

METHOD AND SYSTEM FOR OPEN-LOOP OR CLOSED-LOOP CONTROL OF A TECHNICAL DEVICE

CROSS-REFERENCE TO RELATED APPLICATIONS

This is a U.S. national stage of application No. PCT/EP2021/074481 filed 6 Sep. 2021. Priority is claimed on European Application No. 20199015.7 filed 29 Sep. 2020, the content of which is incorporated herein by reference in its entirety.

BACKGROUND OF THE INVENTION

1. Field of the Invention

The invention relates to and input unit, an open-loop and closed-loop control unit, a method and a system for open-loop or closed-loop control of a technical device.

2. Description of the Related Art

In open-loop and closed-loop control systems for technical facilities (e.g., devices, apparatuses, machines, or plants) at least one open-loop or closed-loop control parameter of the technical device is influenced by at least one initial parameter of an open-loop or closed-loop control facility.

The open-loop or closed-loop parameter can be either a value-discrete parameter (for example, a signal for switching a pump on and off) or an analog parameter, i.e., with a continuous value and time (for example, temperature, pressure, fill level, distance, angle, and/or rotational speed).

The initial parameter can, for example, be an analog or binary actuation signal, which acts via actuators (for example, relay switches, contactors, magnetic valves or motors), on the open-loop or closed-loop object (technological process, control path) and hereby changes the open-loop or closed-loop parameter.

The open-loop or closed-loop control facility creates the at least one initial parameter in this case depending on at least one input parameter.

Analog input parameters are, for example, measurement signals from sensors of temperature, pressure, fill level, distance, angle or rotational speed.

Binary input parameters are, for example, feedback signals from sensors from the open-loop or closed-loop control path regarding the states of the control parameters, for example, a switch setting (on/off), a valve setting (open/closed) or a motion state of a motor (turning/stationary).

What is under open-loop control, for example, is a production line or a movement of a drive.

What is under closed-loop control, for example, is a flow of a medium through a pipe, a fill level of a liquid in a container or a rotational speed or torque of an electric motor.

These types of open-loop and closed-loop control systems are used, for example, in process control systems. Process control systems are used for automation of processes in technical plants. The automated processes can, for example, involve processing or manufacturing processes or processes for generation or distribution of electrical energy.

Process control systems are usually structured hierarchically by a number of levels (see, for example, EP 3 125 053 B1). At the lowest level, known as the field level, the process is explicitly influenced via field devices formed as sensors (for example, pressure transducers, temperature sensors, fill level sensors, and/or throughflow sensors) the states of the technical process are detected or via field devices formed as actuators (for example, position controllers for closed-loop control valves).

Above the field level lies an open-loop and/or closed-loop control level with open-loop and/or closed-loop control facilities, in which a central processing unit (CPU) usually, as a component of a programmable logic controller, performs field-related open-loop and/or closed-loop control functions, where possible in real time, and where as input parameters they receive values of parameters of the process from the sensors and output commands to the actuators, for example, as initial parameters.

At the process control level, lying in its turn above that, a superordinate open-loop and closed-loop control occurs in process control computers, where an operator system consisting of one or more operator stations makes possible the operation and supervision of the process by the operating personnel of the plant.

An exchange of data between the field devices and the central processing unit of the programmable logic controller is usually undertaken via a digital field bus, such as PROFIBUS DP or PROFINET. The field devices often do not have any corresponding field bus connection themselves. As a result, the field devices are linked via decentralized peripheral stations to the digital field bus. A peripheral station usually consists of an interface module (head module) for connection to the digital field bus and a number of peripheral modules (above all digital and analog input and output units) for connection of the field devices. Each input or output unit in this case can only have one so-called channel for connection of a single field device. It can, however, also have a number of channels for connection of a number of field devices.

Usually, the peripheral module is located in such cases directly on site in the field at the field devices, while the programmable logic controller is located at a more central point of the plant. Very future-oriented open-loop and closed-loop control concepts even make provision for a cloud-based open-loop or closed-loop control facility.

In a typical execution sequence, the values of the input parameters provided by the input units of the peripheral modules are read in cyclically by the central processing unit, processed, and values for initial parameters are created. These values for the initial parameters are finally written into the output units.

One problem that presents itself here however is that, at the time of the processing, (apparent) "actual" values present in the central processing unit of the input parameters provided by the input units are out-of-date and no longer current. This delay acts during the open-loop control or closed-loop control as (additional) dead time. The reasons for this delay lie, for example, in:

- the overall process of the signal preparation in the input unit, for example, analog-to-digital conversion and filtering,
- the transmission over in some cases slow field busses to a field bus controller,
- the transmission from field bus controller to central processing unit, and
- delays as a result of the values of all or of at least one group of input units first having to be read in before processing.

This problem manifests itself in particular in process control systems for process or production plants spread over a large area, in particular for plants that can extend over several square kilometers, such as plants of the chemical industry, oil and gas industry, metal industry, mines, power stations, transport infrastructure (airports, tunnels), etc.

In order to compensate somewhat for the bad (worse) open-loop and closed-loop control quality because of out-of-date values, alternatively the processing cycles are shortened. The more frequent execution, however, puts a strain on the central processing unit in particular. Moreover, a higher transmission bandwidth is needed.

Another approach is what is known as clock synchronicity, in which detection, processing and output are strictly clocked. The delay between detection and processing is not rectified but is deterministic. The disadvantages here are the effort involved in project planning and the greater difficulty in making changes during ongoing operation. Moreover, components that are provided specially for the purpose and are thus expensive are required.

SUMMARY OF THE INVENTION

In view of the foregoing, it is therefore an object of the present invention is therefore to provide a system and method via which the effects of the above-described delays can be reduced.

This and other objects and advantages are achieved in accordance with the invention by a method and a system for open-loop control or closed-loop control of a technical device, an input unit, a decentralized peripheral station, a field device with such an input unit, and an open-loop or closed-loop control facility.

The idea underlying the invention is that temporal delays between the detection of the input parameters and the creation of the initial parameters from the input parameters, in particular delays during the transmission of input parameters, cannot be eliminated, and in any event can be reduced with great effort. So that a central processing unit, during the creation of the initial parameters as a function of input parameters, can still actually process current "actual" values for input parameters, instead of "old" values, the central processing unit must be provided in advance with predicted "future" values as input parameters. When the predicted values lie in the future by a period of time that is moved by the order of magnitude of the explained temporal delays, in particular of the transmission times, these temporal delays can be compensated for at least in part, preferably entirely.

A parameter detected in the technical device can be continuously traced for this purpose and with the aid of algorithmic methods, in addition to or instead of the current value of this parameter, one or more values of this parameter predicted in the future can be created and used as an input parameter for the open-loop or closed-loop control.

Therefore, in accordance with the invention, a predicted future value of a parameter detected in the technical device can be used as input parameter, in order to compensate, at least in part, for temporal delays between the detection of the parameter and the creation of the initial parameter from the input parameter.

To this end, the predicted value preferably lies by a period of time in the future, where the period of time is set as a function of the temporal delays between the detection of the parameter and the creation of the initial parameter from the input parameter.

Since the accuracy of the prediction decreases with an increasing period of time, the period of time is preferably equal to or less than the sum of these temporal delays. Advantageously, an optimum is set between the processing of values that are as current as possible (period of time as great as possible) and accuracy of the prediction (period of time as small as possible).

The prediction can be undertaken by usual means known to the person skilled in the art, such as extrapolation of the waveform, artificial intelligence, pattern recognition and the like. For example, the fill level in a tank that is cylindrical at the top and conical at the bottom, even with a constant inflow or outflow, does not change steadily, but exhibits an unsteadiness at the kink of the tank. Also, with irregular inflow and/or outflow the kink will have an effect and ultimately form a pattern that can be predicted by pattern recognition.

The parameter of the technical facility that is detected and of which the value can be determined preferably involves an analog sensor signal (of a temperature, pressure, fill level or throughflow sensor, for example). A binary sensor signal, such as a switch setting (on/off), a valve setting (open/closed) or a motion state of a motor (turning/stationary), can also be involved however.

In accordance with an especially advantageous embodiment, the inventive method comprises:

a) detection of a parameter of the technical device,
b) determination of a (current) value of the parameter,
c) prediction of at least one future value of the parameter based on at least the (current) value of the parameter determined, and
d) use of the at least one predicted future value of the parameter as input parameter for the creation of the at least one initial parameter.

The prediction of the future value of the parameter can be undertaken merely on the basis of the current value of the parameter determined. For an improved accuracy of the prediction, the prediction is however undertaken using or as a function of further values, such as:

- use of further values of the parameter determined earlier,
- use of predicted values of the parameter already predicted earlier,
- use of current and/or earlier determined values of other detected parameters,
- use of predicted values of other parameters already predicted earlier.

When the at least one initial parameter is created as a function of the at least one input parameter in an open-loop or closed-loop control facility, then preferably at least steps a) and b) are performed outside the open-loop or closed-loop control facility.

Step c) can basically be performed at any suitable point on a transmission path between the detection of the value of the input parameter and the open-loop or closed-loop control facility, or even in the open-loop or closed-loop control facility itself.

In accordance with an especially advantageous embodiment however all steps a) to c) are performed outside the open-loop or closed-loop control facility, in particular in a decentralized peripheral station or in a field device, and the at least one predicted future value of the parameter is transmitted to the open-loop or closed-loop control facility. The open-loop or closed-loop control facility is consequently supplied with the predicted future value of the parameter for the open-loop or closed-loop control of the facility from outside.

In this case, it is also possible for the execution of steps a) to c) to be distributed to a number of components. Thus, for example, steps a) to b) can be performed in a first component outside the open-loop or closed-loop control facility, in particular in a decentralized peripheral station or in a field device, and step c) can be performed in a second component, which is arranged along a transmission path from the first component to the open-loop or closed-loop control facility, in particular in a controller of a field bus.

In accordance with a further advantageous embodiment, the value of the parameter is determined at a first point in time and the at least one predicted future value relates to a second point in time, which lies in the future by a defined or definable period of time in relation to the first point in time.

The period of time can then preferably be set as a function of a transmission time of the (current) value of the parameter determined or of the predicted future value of the parameter to an open-loop or closed-loop control facility, which creates the at least one initial parameter as a function of the at least one input parameter. This enables a constant transmission time from a component that detects the parameter to an open-loop or closed-loop control facility to be compensated for very easily.

Preferably, the period of time is equal to or less than this transmission time. An optimum can be set here between the accuracy of the prediction (the greater the period of time the less accurate is the prediction) and the processing of outdated values of the input parameter (the greater the period of time the more out of date are the values of the input parameter).

In accordance with a further advantageous embodiment, the value of the parameter at a first point in time is determined and from this a number of predicted future values are created, which relate to a number of points in time in the future, which each lie in the future by different lengths of time in relation to the first point in time.

The (current) value of the parameter determined as well as the point in time of the determination of the value of the parameter and of all predicted future values of this parameter can be output for this purpose in a common dataset, such as to an open-loop or closed-loop control facility.

Then a selection of one or more of the predicted future values of the parameter as an input parameter can be made as a function of a transmission time of the (current) value of the parameter determined or of the predicted future values of the parameter to an open-loop or closed-loop control facility, which creates the at least one initial parameter as a function of the at least one input parameter.

For example, the open-loop or closed-loop control facility can determine the point in time of the receipt of the dataset and as a function of a difference between this point in time of the receipt and the transmitted point in time of the determination of the (current) value of the parameter, can select one of the predicted future values of this parameter for the open-loop or closed-loop control of the technical device.

The presently contemplated embodiment of the method is especially suitable for the case in which the transmission time from the detection of the parameter to the open-loop or closed-loop control facility is variable. A maximum flexibility and adaptability to changing transmission times is possible when the temporal distances between the predicted future values are equidistant, the temporal distances are able to be parametrized, the number of these values is able to be parameterized and all these values are time stamped.

An inventive system for open-loop or closed-loop control of a technical device comprises an open-loop or closed-loop control facility with at least one initial parameter, through which an open-loop or closed-loop control parameter of the technical device is able to be influenced. The open-loop or closed-loop control facility is configured to create the at least one initial parameter as a function of at least one input parameter. The input parameter here is a predicted future value of a parameter detected in the technical device, in order to compensate, at least in part, for temporal delays between the detection of the parameter and the creation of the initial parameter from the input parameter.

An inventive input unit for creation of an input parameter for an open-loop or closed-loop control facility of a technical device includes processor and memory and is configured to perform the following:

a) detection of a parameter of the technical device, in particular of an analog sensor signal,
b) determination of a (current) value of the parameter,
c) prediction of at least one future value of the parameter based on at least the value of the parameter determined, and
d) output of the predicted future value of the parameter.

The embodiments of method steps a) to c) described above in conjunction with the inventive method and their stated advantages are equally applicable to the inventive input unit. Preferably, the input unit has an interface to a communication facility and is configured to output the predicted future value of the parameters to the communication facility via this interface.

An inventive decentralized peripheral station comprises the input unit as described above.

Furthermore, an inventive field device comprises the input unit as described above.

In an inventive open-loop or closed-loop control facility for a technical facility, where the open-loop or closed-loop control facility creates at least one initial parameter as a function of at least one input parameter, the input parameter is a predicted future value of a parameter detected in the technical device.

In accordance with one advantageous embodiment, the open-loop or closed-loop control facility has an interface to a communication facility and is configured to receive the predicted future value of the parameter from the communication facility via this interface.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention, as well as further advantageous embodiments of the invention in accordance with disclosed features, will be explained in greater detail below with the aid of exemplary embodiments in the figures, in which.

DETAILED DESCRIPTION OF THE EXEMPLARY EMBODIMENTS

Figure 1:
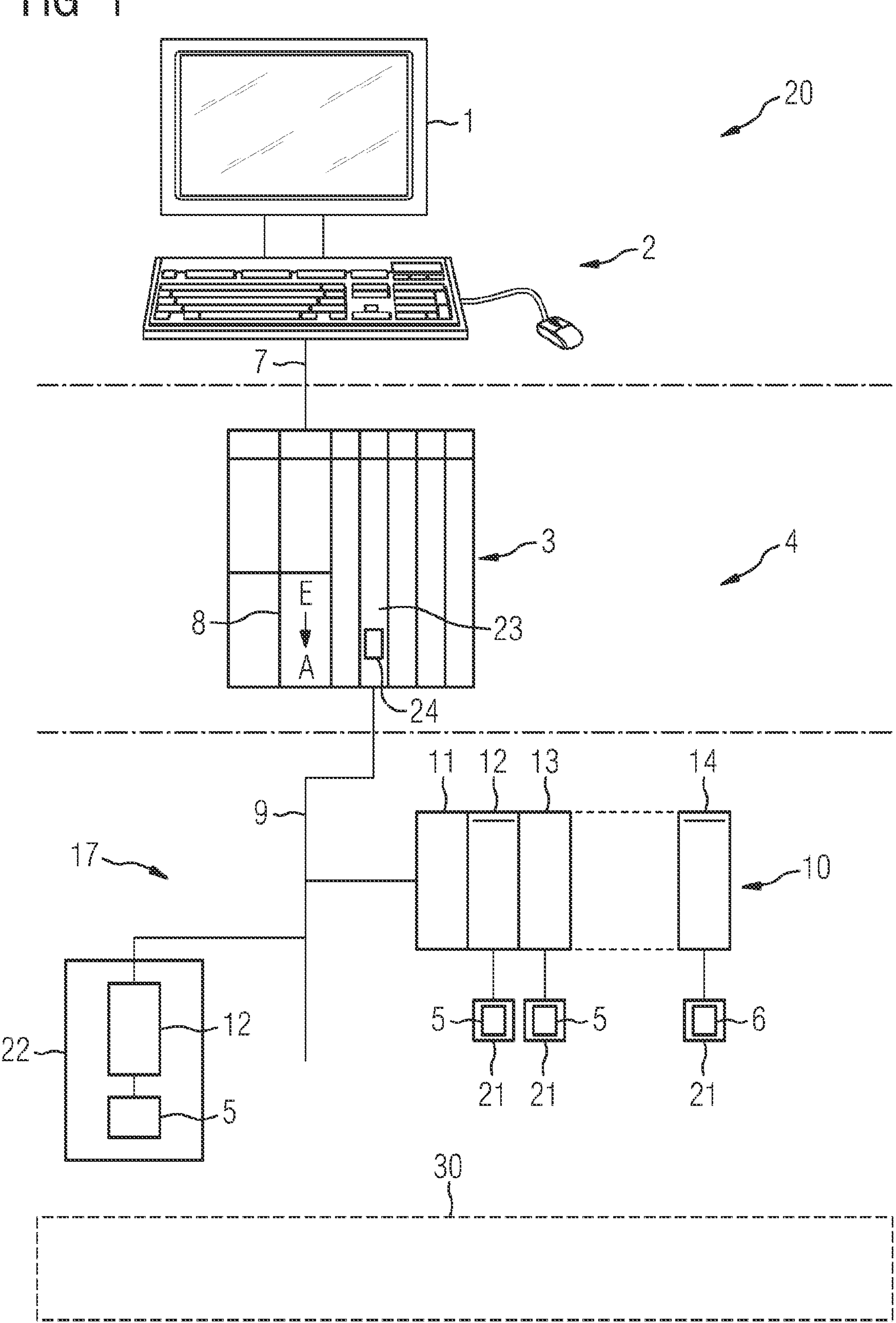
FIG. 1 shows a section from a process control system with a peripheral module in accordance with the invention.

FIG. 1 shows, in a schematic block diagram, a section from a process control system 20 for a technical process or a process plant 30 with an operator station 1 at a process management level 2, a programmable logic controller (SPS) 3 at a control level 4 and field devices 21, 22 that detect via sensors 5 at a field level 17 states of the technical process or of the process plant 30 or explicitly influence the process or the process plant 30 via actuators 6.

At the process management level 2, a superordinate open-loop control and closed-loop control occurs, where an operator system consisting of the operator station 1 and where necessary further operator stations (not shown) makes possible the operation and supervision of the process or of the process plant 30 by operating personnel of the plant. The technical process or the process plant 30 involves a plant of the chemical industry, the oil and gas industry, the metal industry, a mine or a power station, for example.

The sensors 5 involve sensors for pressure, temperature, fill level, throughflow for example.

The actuators 6 involve position controllers for closed-loop control valves, for example.

The operator station 1 and the programmable logic controller 3 are connected to one another via a plant bus 7 (for example, Ethernet).

The programmable logic controller 3, as well as further modules, has a processing unit (CPU unit) 8, which processes an open-loop control or user program and, in doing so, processes values of input parameter E and creates values for initial parameter A as a function thereof.

The programmable logic controller 3 in this case performs field-oriented open-loop and closed-loop functions in real time where possible. The values of the input parameters E are received in this case via a digital field bus 9 (for example, PROFIBUS DP) from the sensors 5 and the values of the initial parameters A are output via the digital field bus 9 to the actuator or the actuators 6. For linkage to the field bus 9, the controller 3 has a communications module 23, which also comprises a controller 24 for the field bus 9 (field bus controller).

FIG. 1 furthermore shows an intelligent field device 22, which is connected directly to the field bus 9. The field device 22 comprises a sensor 5 and an input unit 12.

The field devices 21 themselves do not have a field bus connection. Accordingly, the field devices 21 are linked via a decentralized peripheral station 10 to the digital field bus 9.

The controller 3 is consequently connected for communication via the digital field bus 9 both to the peripheral station 10 and also to the field device 22.

The peripheral station 10 consists of an interface module (head module) 11 for connection to the digital field bus 9 and a number of peripheral modules. The peripheral modules can involve digital and analog input and output modules or units. In the exemplary embodiment, an inventive input unit 12, a further input unit 13 and an output unit 14 inter alia are present as peripheral modules.

The peripheral modules are formed here as single-channel units for connection of a field device 21 (sensors 5 or actuators 6) in each case, but they can also be formed as multi-channel units, i.e., they then comprise a number of channels in each case, to which one field device 21 (with sensor 5 or actuator 6) can be connected in each case.

To simplify the diagram, only a few field devices 21, 22, only a single decentralized peripheral station 10, only a single controller 3 and also only a single operator station 1 are shown. In practice, plants as a rule comprise a plurality of such components, however.

From the input units 12, 13, signals of the sensors 5 (for example, measured currents, and/or measured voltages) are detected and values of these parameters determined. When these values are now transmitted via the field bus 9 to the controller 3 and used in the central processing unit 8 as input parameters E, the (apparent) "actual" values of the input parameters E provided by the input units 12, 13 can already be outdated at the point in time of the processing in the central processing unit 8 and no longer be up-to-date. This delay acts in the open-loop or closed-loop control as an (additional) dead time. The reasons for this delay lie, for example, in:

- the overall process of the signal preparation in the input unit 12, 13, for example, analog-to-digital conversion and filtering,
- the transmission in an internal backplane bus of the peripheral station 10 from the input unit 12 to the interface module 11,
- the transmission via the (in some cases) slow field bus 9 to the field bus controller 24 in the controller 3,
- the transmission from the field bus controller 24 to the central processing unit 8, and
- delays caused by the fact that, before the processing in the central processing unit 8, the values of all or of at least one group of input units 12, 13 must be initially read in.

This problem manifests itself in particular in large process control systems 20 for process or manufacturing plants spread over a large area, in particular for plants that can extend over several square kilometers, such as plants of the chemical industry, oil and gas industry, metal industry, mines, and/or power stations, transport infrastructure (airports, tunnels).

In accordance with the invention, the central processing unit 8 is therefore provided in advance with predicted "future" values as input parameters E. Thus, the central processing unit 8 can actually process current "actual" values for the input parameters E instead of "old" values. This enables the above-outlined delays to be compensated for. A parameter detected in the technical device (for example, measured current, or measured voltage) can be continuously traced for this purpose and with the aid of algorithmic methods, in addition to or instead of the current value of these parameters, one or more values of these parameters predicted in the future can be created and used as input parameter E in the controller 3.

The future value can basically be predicted in this case in any given component on the transmission path from the place of determination of a value of the parameters of the plant 30 to the central processing unit 8. In the case of the peripheral station 10 this can be undertaken, for example, in the input unit 12, 13, at another point in the decentralized peripheral station 10, or in the controller 3, such as in its communication module 23, in particular in the field bus controller 24. In the case of the intelligent field device 22, this can be undertaken, for example, in the input unit 12 or in the controller 3, for example, in its communication module 23, in particular in the field bus controller 24.

In the exemplary embodiment, the prediction of the future value in the case of the input units 12 is made in the input unit itself, i.e., the predicted future value is then transmitted via the field bus 9 to the controller 3 and used therein by the central processing unit 8 as input parameter E.

In the case of the input unit 13, on the other hand, the prediction of the future value is made in the field bus controller 24, i.e., a determined (current) value of a parameter (for example, measured current, or measured voltage) is transmitted from the input unit 13 to the controller 3 and then a predicted future value of this parameter is created by the field bus controller 24, which is then used by the central processing unit 8 as input parameter.

Figure 2:
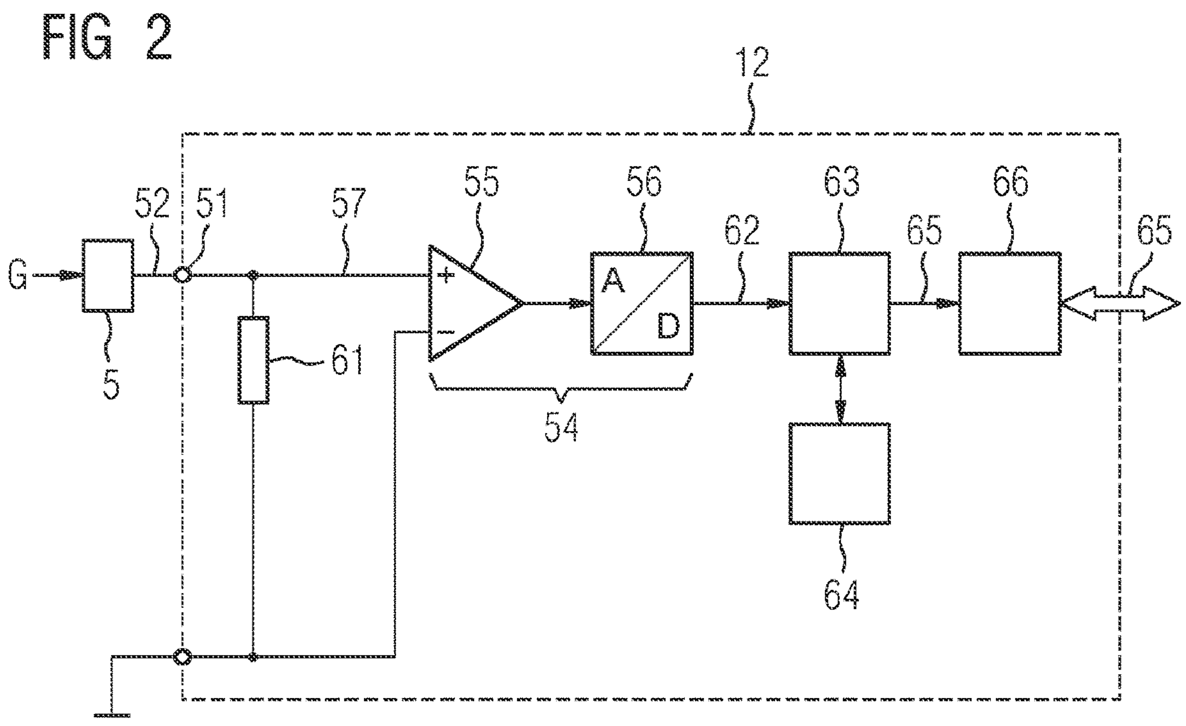
FIG. 2 shows a first embodiment of an inventive input unit as an analog input unit in accordance with the invention.

With reference to FIG. 2, shown therein is a basic layout of the input unit 12, which creates and outputs a predicted future value. The input unit 12 is configured in this case as an analog input unit. This is connected by its analog input 51 via a line 52 to the sensor 5, here a measured current sensor. The measured current sensor involves a measurement transducer, for example, which creates a measured current I of between 4 and 20 mA proportional to a detected measured value G. The measured value G involves a parameter of the plant 30, for example, a temperature, a pressure, or a throughflow.

The input unit 12 contains a voltage measurement facility 54 consisting of a differential amplifier 55 and a downstream analog-to-digital converter 56, which lies with its voltage measurement input 57 directly at the analog input 51, i.e., the analog input 51 is the voltage measurement input 57.

The current measurement resistor 61 is embodied as a precision resistor and has a resistance value of, for example, 250Ω. The voltage measurement facility 54 detects the voltage drop created by the measurement current I via the current measurement resistor 61 and converts this into a digital measured value 62 for the detected measured value G.

The current value 62 of the measured value G is received by a control unit 63 and transferred to a prediction unit 64. The prediction unit 64 predicts at least one future value 65 of the measured value G based on the current value 62 of the parameter determined and returns this predicted future value 65 to the control unit 63. The prediction can be made, for example, by extrapolating the waveform, artificial intelligence, pattern recognition and the like. For example, a likely waveform of the measured value G could be determined (by averaging from the last waveforms for example). Also, the waveform of other measured values could be used to estimate future values of the measured value G. In the simplest case a typical waveform could also have been predicted beforehand, i.e., stored in the prediction unit 64, for example.

The control unit 63 outputs the predicted, future value 65 via a communications interface 66 to the superordinate controller 3.

With a use of the input unit 12 in a decentralized peripheral station 10 in accordance with FIG. 1, the communications interface 66 is configured as an interface connection to an internal bus (for example, a backplane bus) of the peripheral station 10. The actual interface to the field bus 9 is then provided by the interface module 11.

On the other hand, in the case of the field device 22, the communications interface 66 will already be an interface to the field bus 9.

Figure 3:
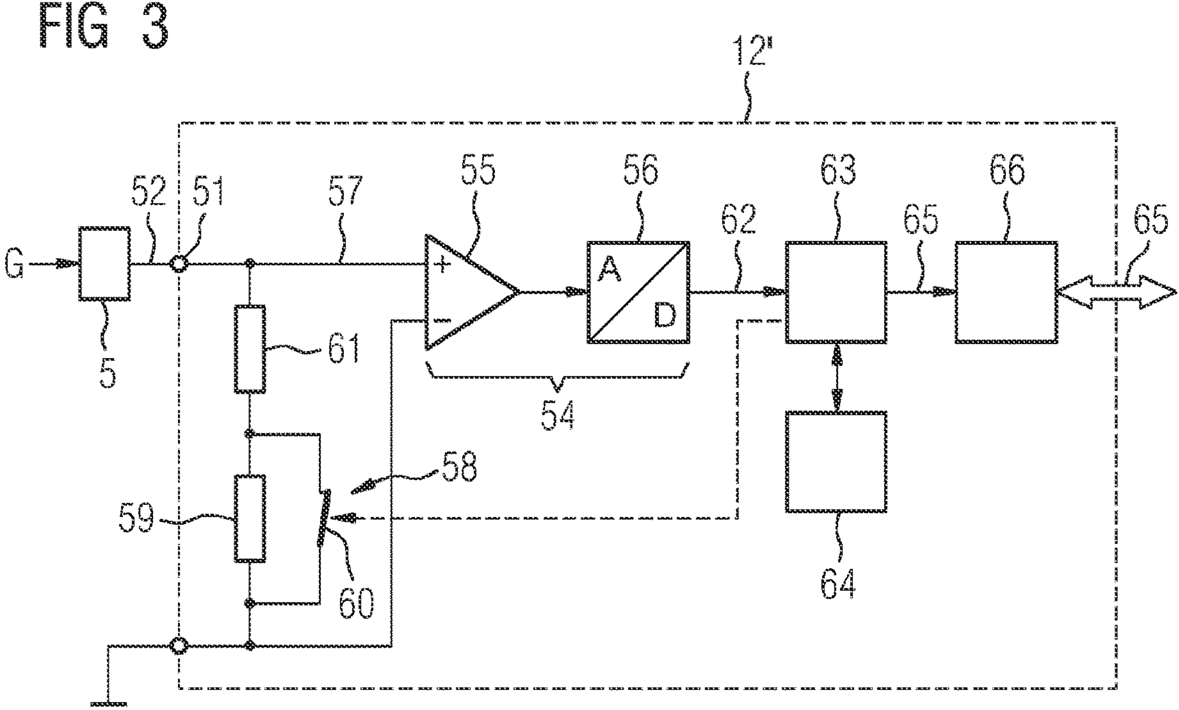
FIG. 3 shows a second embodiment of an inventive input unit as an analog/binary input unit in accordance with the invention.

An input unit 12' shown in FIG. 3 can optionally be operated as an analog input unit for a measurement current or as a binary input unit for a voltage. Unlike the input unit 12 in accordance with FIG. 2, a switchover facility 58 is present here. The switchover facility 58 comprises a parallel circuit made of a high-resistance resistor 59 and a controllable switch 60, which lies in series with the low-resistance current measurement resistor 61 at the analog input 51 or the voltage measurement input 57. The analog input 51 can thus be switched via the controllable switchover facility 58 between a high-resistance state and a low-resistance state.

The high-resistance resistor 59 has a resistance value of, for example, 1 MΩ. With switch 60 closed, i.e., in the low-resistance state of the analog input 51, the voltage measurement facility 54 determines the voltage drop created by the measurement current I across the current measurement resistor 61 and converts this into a current digital measured value 62 for the detected measured value.

In operation as a binary input unit, the controllable switch 60 is opened, so that the high-resistance resistor 59 and the low-resistance current measurement resistor 61 form a voltage divider and the voltage measurement facility measures a high or low signal level of the voltage present at the input of the respective binary input unit.

In operation as an analog input unit for a measurement current, the controllable switch 60 is closed, so that the high-resistance resistor 59 is ineffective and the measurement current flows through the low-resistance current measurement resistor 61.

The future values 65 of the parameter G predicted by the input units 12, 12' are transmitted to the controller 3 and used in the central processing unit 8 as input parameter E for the creation of the initial parameter A.

Figures 4, 5:
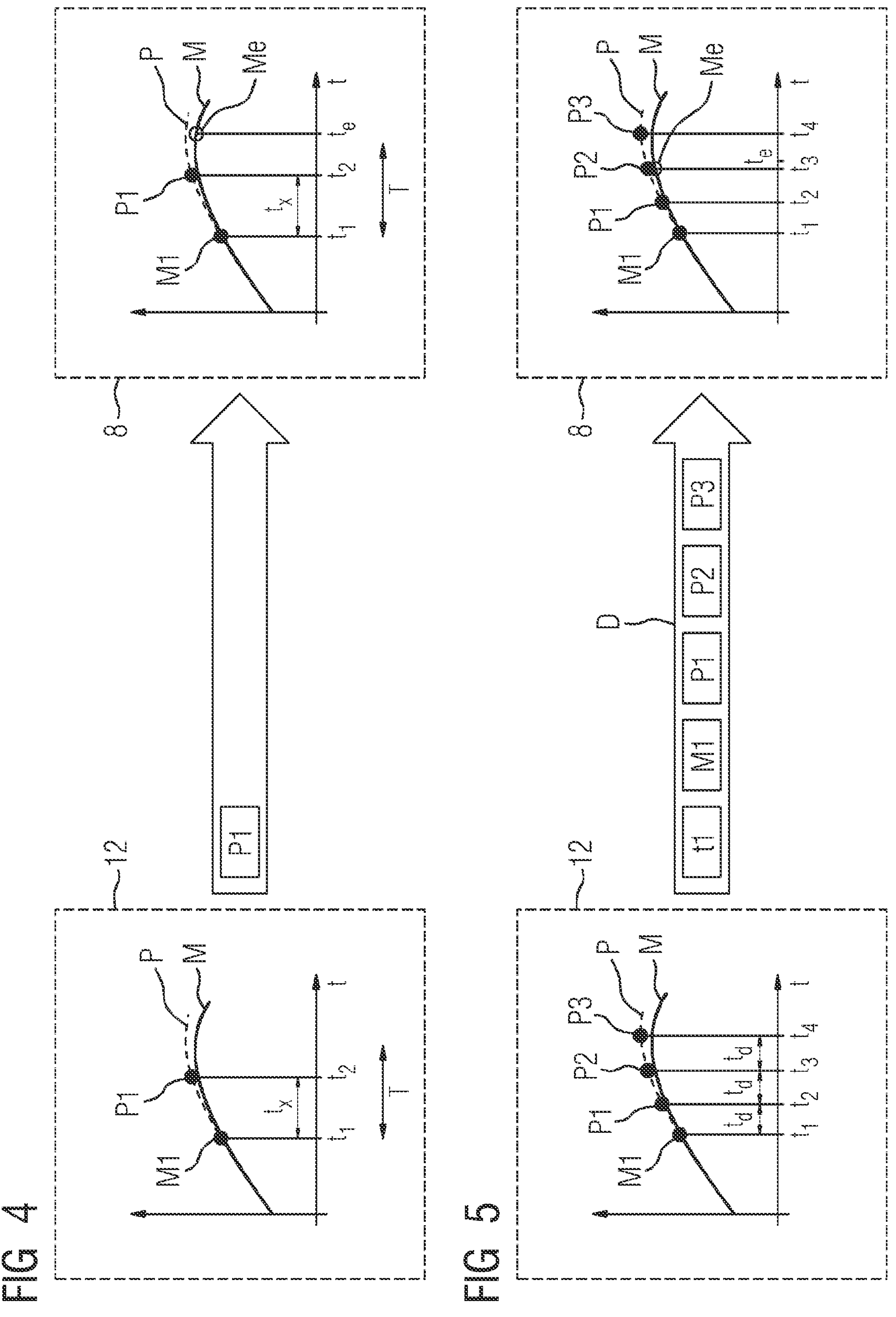
FIG. 4 shows a basic method execution sequence with a constant transmission time via a field bus in accordance with the invention.
FIG. 5 shows a basic method execution sequence with a variable transmission time via a field bus in accordance with the invention.

FIGS. 4 and 5 are illustrate how the predicted future value of the parameter G is determined and is then used in the open-loop or closed-loop control of the plant 30.

In the case of FIG. 4, the starting point is a constant transmission time T from an input unit 12 of the decentralized peripheral station 10 or the field device 22 to the central processing unit 8.

On the input unit 12 side the measured value G is detected and a current value M1 of the measured value G at a first point in time t1 is determined. From this current value M1 of the measured value a predicted, future value P1 of the measured value at a second point in time t2 is determined in the input unit 12, which lies by a defined period of time tx in the future in relation to the first point in time t1. The values delivered by the prediction unit 64 are thus always calculated by the time tx into the future. In this case, M refers to a real signal waveform and P to a predicted signal waveform.

The predicted, future value P1 is transmitted via the field bus 9 to the controller 3. In the central processing unit 8 (instead of the measured value M1) the predicted, future value P1 is used as input parameter for the open-loop or closed-loop control. te in this case refers to the point in time of the receipt of the value P1. Me indicates the value that could be measured a the receive time if there were not to be any delays; it can be employed as a reference for the deviation.

The period of time tx is set as a function of the transmission time T from the input unit 12 to the controller 3 and in this case is preferably less than or equal to the transmission time T.

With tx=0 the entire system behaves as if no predicted future values are used.

With tx=T temporally corrected predicted values are available to the central processing unit 8 of the controller 3. The prediction can, however, have inaccuracies, depending on the dynamics of the input signal in relation to the transmission time to be bridged by the prediction.

Advantageously, as shown in FIG. 4, an optimum is selected between a processing of rather outdated relevant values (at the time) and rather current, possibly more widely deviating values for this. Consequently 0<tx<T is set. Thus, preferably an optimum is set between the accuracy of the prediction (the greater is the period of time the more inaccurate is the prediction) and the processing of outdated values of the input parameters (the greater is the period of time the more out-of-date are the values of the input parameters).

In the case of FIG. 5, the starting point is a variable transmission time T from an input unit 12 of the decentralized peripheral station 10 or the field device 22 to the central processing unit 8.

Here too a current value M1 of a measured value G at a first point in time t1 is determined on the input unit 12 side. From this current value M1 of the measured value G a number of predicted, future values P1, P2, P3 of the measured value are created in the input unit 12, which relate to a number of points in time t2, t3, t4 in the future, which lie by a different period of time, here by different multiples of td, in the future in relation to the first point in time t1.

The current value M1 of the parameter determined as well as the point in time t1 of the determination of the value of the parameter and all predicted future values P1, P2, P3 of this parameter can then be output in a common dataset D to the field bus 9 and thus to the central processing unit 8 in the controller 3.

Then, in the central processing unit 8, a selection of one or more of the predicted future values P1, P2, P3 as input parameter can be made as a function of a transmission time T of the current value M1 of the parameter or of the predicted future values P1, P2, P3 of the parameter determined to the central processing unit 8 in the controller 3.

For example, the central processing unit 8 can determine the point in time to of the receipt of the dataset D and as a function of a difference between this point in time to of the receipt and the point in time t1 of the determination of the value of the parameter, can select one of the predicted future values of this parameter as input parameter E for the open-loop or closed-loop control of the plant 30. Me once again indicates the value that could be received at the point in time of receipt if there were not to be any delays, screened by the "clocking" due to the temporal distances of the predicted future values P1, P2, P3.

A maximum flexibility and adaptability to changing transmission times is possible when, as here, the temporal distances td of the predicted future values are equidistant, the temporal distances can be parameterized, the number of these values can be parameterized and all these values are time-stamped. A time stamp does not mean under any circumstances, however, that a complete time of day must be given with each value. A time of day for the current value (as seen by the input unit 12) is sufficient for temporally equidistant and known distances of the following future values. This one and first-time stamp could also be a pure numerical value, which is incremented by a system-wide clock signal equally in the input units 12 and the central processing unit 8.

Thus the accuracy of the open-loop or closed-loop control via the controller 3 can be improved with the disclosed embodiments of the invention. The concomitant lessening of the load on the central processing unit 8 reduces its costs and power dissipation (C02). In the disclosed embodiments of the invention, existing field busses, such as PROFINET-I/0 or Profibus-DP can be used: In the case of FIG. 4 the volume of data can remain unchanged. In the case of FIG. 5 the values can be transmitted via more consistent useful data. The disadvantages of low-cost but slow transmission paths can be compensated for in part or entirely by the predictions.

In particular, large fluctuations in the transmission time in Cloud-based automation (i.e., of a Cloud-based open-loop or closed-loop control facility) can be compensated for.

Figure 6:
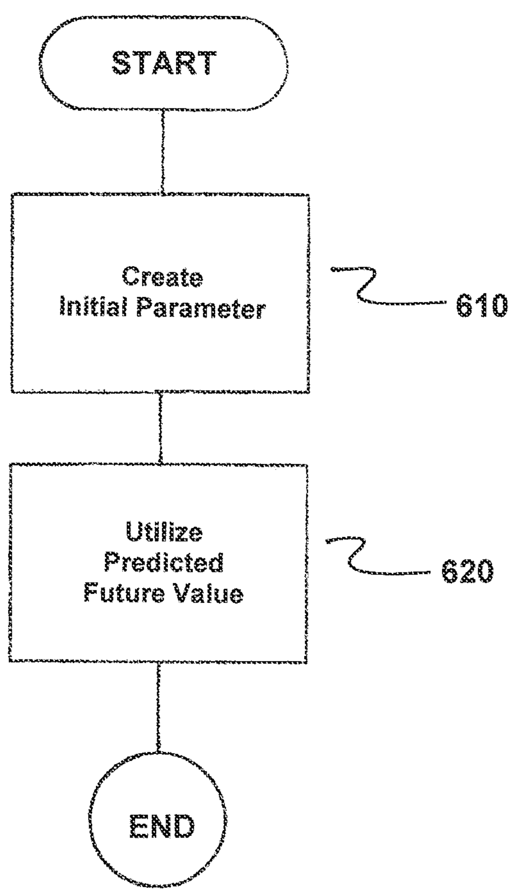
FIG. 6 is flowchart of the method in accordance with the invention.

FIG. 6 is flowchart of the method for open-loop or closed-loop control of a technical device 30, where an open-loop or closed loop parameter of the technical device 30 is influenced by at least one initial parameter A. The method comprising creating the at least one initial parameter A as a function of at least one input parameter E, as indicated in step 610. Next, a predicted future value P1 of a parameter G detected in the technical device as the input parameter E is used to compensate, at least in part, for temporal delays between the detection of the parameter G and the creation of the initial parameter A from the input parameter E, as indicated in step 620.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for open-loop or closed-loop control of a technical device, an open-loop or closed-loop parameter of the technical device being influenced by at least one initial parameter, the method comprising:

creating the at least one initial parameter as a function of at least one input parameter; and utilizing a predicted future value of a parameter detected in the technical device as the input parameter to compensate, at least in part, for temporal delays between the detection of the parameter and the creation of the initial parameter from the input parameter;

wherein a value of the parameter detected in the technical device at a first point in time is detected and the at least one predicted future value relates to a second point in time, which lies in the future by a defined or definable period of time in relation to the first point in time; and wherein the definable period of time is set as a function of a transmission time of the value of the parameter detected in the technical device determined or of the predicted future value of the parameter to an open-loop or closed-loop control facility, which creates the at least one initial parameter as a function of the at least one input parameter.

2. The method as claimed in claim 1, wherein said compensating comprises:

a) detecting a parameter comprising a sensor signal of the technical device, b) determining a value of the parameter comprising the sensor signal, c) predicting at least one future value of the parameter comprising the sensor signal based on at least the value of the parameter comprising the sensor signal determined, d) utilizing the at least one predicted future value of the parameter comprising the sensor signal as the input parameter to create the at least one initial parameter.

3. The method as claimed in claim 2, wherein the creation of the at least one initial parameter as a function of the at least one input parameter is undertaken in an open-loop or closed-loop control facility; and wherein at least the steps a) and b) performed outside the open-loop or closed-loop control facility.

4. The method as claimed in claim 3, wherein steps a) to c) are all performed outside the open-loop or closed-loop control facility in a decentralized peripheral station or in a field device; and wherein the at least one predicted future value of the parameter is transmitted to the open-loop or closed-loop control facility.

5. The method as claimed in claim 3, wherein steps a) to b) are performed in a first component outside the open-loop or closed-loop control facility, said first component comprising a decentralized peripheral station or a field device; and wherein step c) is performed in a second component which is arranged along a transmission path from the first component to the open-loop or closed-loop control facility, said second component comprising a controller of a field bus.

6. The method as claimed in claim 4, wherein steps a) to b) are performed in a first component outside the open-loop or closed-loop control facility, said first component comprising the decentralized peripheral station or a field device; and wherein step c) is performed in a second component which is arranged along a transmission path from the first component to the open-loop or closed-loop control facility, said second component comprising a controller of a field bus.

7. A system for open-loop or closed-loop control of a technical device, with an open-loop or closed-loop control facility with at least one initial parameter, through which an open-loop or closed-loop parameter of the technical device is influenceable, the open-loop or closed-loop control facility being configured to create the at least one initial parameter as a function of at least one input parameter, the system comprising:

a decentralized peripheral station;

an input unit including a processor and memory;

a field device; and an open-loop or closed-loop control facility;

wherein the input parameter is a predicted future value of a parameter detected in the technical device to compensate, at least in part, for temporal delays between the detection of the parameter and the creation of the initial parameter from the input parameter;

wherein a value of the parameter detected in the technical device at a first point in time is detected and the at least one predicted future value relates to a second point in time, which lies in the future by a defined or definable period of time in relation to the first point in time; and wherein the definable period of time is set as a function of a transmission time of the value of the parameter detected in the technical device determined or of the predicted future value of the parameter to an open-loop or closed-loop control facility, which creates the at least one initial parameter as a function of the at least one input parameter.

8. A method for open-loop or closed-loop control of a technical device, an open-loop or closed-loop parameter of the technical device being influenced by at least one initial parameter, the method comprising:

creating the at least one initial parameter as a function of at least one input parameter; and utilizing a predicted future value of a parameter detected in the technical device as the input parameter to compensate, at least in part, for temporal delays between the detection of the parameter and the creation of the initial parameter from the input parameter;

wherein the value of the parameter detected in the technical device at a first point in time is determined; and wherein a plurality of predicted future values, which relate to a number of points in time in the future, which each lie in the future by a different period of time in relation to the first point in time, are created; and wherein a selection of at least one of the predicted future values of the parameter detected in the technical device as the input parameter is undertaken as a function of a transmission time of the value of the parameter determined or of the predicted future values of the parameter detected in the technical device to an open-loop or closed-loop control facility, which creates the at least one initial parameter as a function of the at least one input parameter.

* * * * *